United States Patent Office 3,155,402
Patented Nov. 3, 1964

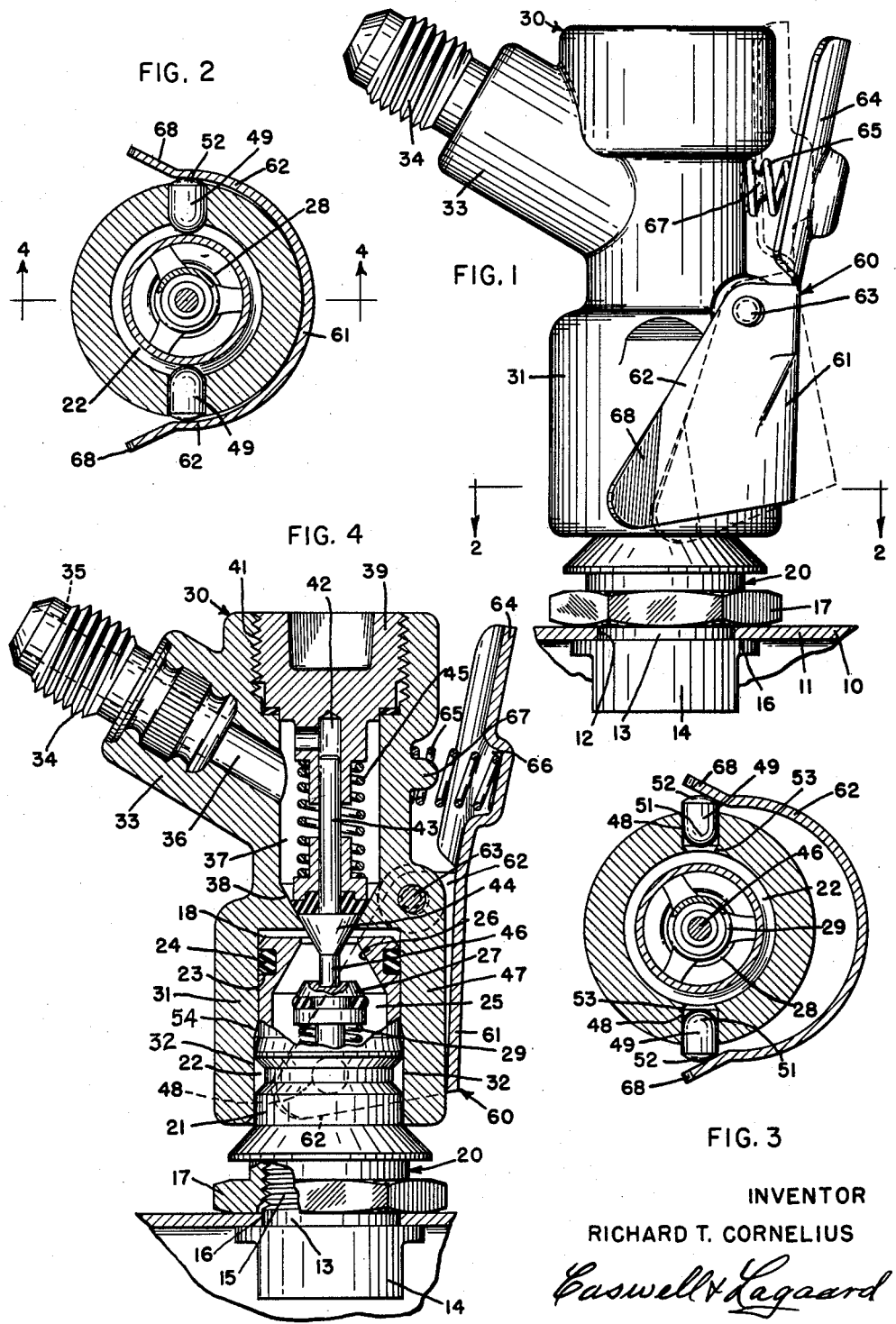
INVENTOR
RICHARD T. CORNELIUS

3,155,402
MANUAL DISCONNECT COUPLING WITH PIVOTED LEVER HAVING DETENT ENGAGING FACING CAMS
Richard T. Cornelius, 3537 Zenith Ave. S., Minneapolis, Minn.
Filed Apr. 11, 1960, Ser. No. 21,522
5 Claims. (Cl. 285—88)

The herein disclosed invention relates to couplings for connecting the free end of a flexible conduit to a fitting and has for an object to provide a construction by means of which the result may be accomplished in a simple and expeditious manner.

Another object of the invention resides in providing a construction in which the coupling is positively held attached to the fitting.

A still further object of the invention resides in providing the fitting and coupling with valves and in, further, providing means for opening the valve of the fitting when the coupling is applied. An object of the invention resides in constructing the fitting with a groove in the form of a truncated V and in providing the coupling with a wall structure encircling the fitting and having oppositely extending radial guides registering with said groove.

An object of the invention resides in providing elongated plungers slidable in said guides and having spherical heads at their inner ends and crowned cam followers at their outer ends.

Another object of the invention resides in providing a lever pivoted to the body for swinging movement about an axis parallel with the plane of said groove and having cams engageable with said cam followers to move the same into said groove.

Other objects of the invention reside in the novel combination and arrangement of parts and in the details of construction hereinafter illustrated and/or described.

In the drawings:

FIGURE 1 is an elevational view of a coupling and the fitting to which the same is applied and illustrating an embodiment of the invention.

FIGURE 2 is a plan sectional view taken on line 2—2 of FIGURE 1.

FIGURE 3 is a view similar to FIGURE 2 and showing the parts in altered position.

FIGURE 4 is an elevational sectional view taken on line 4—4 of FIGURE 2.

For the purpose of illustrating the invention, the wall structure 11 of a receptacle 10 containing a fluid under pressure has been shown. This wall structure has an opening 12 in the same and in which is mounted the threaded neck 13 of a nipple 14 forming part of a fitting 20. The neck 13 of this nipple is provided with threads 15 and a shoulder 16, which engages the inner surface of the receptacle 10. Screwed on the threads 15 is a nut 17, having a projecting portion 21, cylindrical in form, and which is constructed with a truncated, V-shaped, groove 22 encircling the same. The outermost end of the projecting portion 21 has an annular groove 23 and in which is disposed an O-ring 24. The extreme end of the projecting portion 21 is formed with a bevel 18. The fitting 20 has a passageway 25 in the same terminating at its upper end in a valve seat 26. This valve seat is adapted to be engaged by means of a valve head 27, slidably mounted in a guide 28 and urged into engagement with the valve seat 26 by means of a compression coil spring 29, seated at one end against said valve head and at its other end against said guide.

The coupling proper is designated by the reference numeral 30 and comprises a body 31 having a bore 32 open at the lower end of the body and extending inwardly into the same. The body 31, further, has an arm 33 in which is received a threaded connecter 34 by means of which the coupling may be connected to a flexible hose, not shown. The connector 34 is provided with a passageway 35 extending through the same and which communicates with a passageway 36 in the arm 33. This passageway, in turn, communicates with a valve chamber 37 disposed beyond the bore 32, but in axial alignment therewith. The valve chamber 37 terminates in a valve seat 38 which communicates with the bore 32 and, also, the passageway 35 in the fitting 20. The chamber 37 opens outwardly through the upper end of the body 31 and is closed by means of a plug 39. This plug is threaded and screws into threads 41 in the body 31. The inner end of the plug 39 is constructed with a bore 42, forming a guide for a valve stem 43. Valve stem 43 has mounted on the end of it a valve head 44 which is adapted to seat against the valve seat 38. A compression coil spring 45 urges the valve head 44 into engagement with said seat. The valve head 44 has a pin 46 at the reduced end thereof which extends appreciably beyond the valve seat 38 and is adapted to engage the valve head 27. When the coupling is applied to the projecting portion 31 of the fitting 20, the pin 46 causes the valve head 27 to unseat from the valve seat 26 and allows the fluid in the receptacle 10 to flow out of the fitting 20 and into the valve chamber 27 of the coupling 30.

For holding the coupling attached to the fitting 20, the V-shaped groove 22 in the projecting portion 21 of the fitting is employed. Opposite this groove and in the plane theerof are formed in the wall 47, forming the portion of the body 31, encircling bore 32, two transverse bores 48 which are radially disposed and in alignment. These bores serve as guides for slidably supporting two cylindrical plungers 49. Plungers 49 have spherical heads 51 at the inner ends thereof which are adapted to enter the groove 22 in the projecting portion 21 and to lock the coupling from movement relative to the fitting. The outer ends of the plungers 49 are constructed with crowned cam followers 52 which serve to move the plungers inwardly toward the groove 22. Restrictions 53 at the inner ends of the bores 48 limit the inward movement of the plungers 49 to prevent the same entering the bore 32 to an extent preventing the insertion of the projecting portion 21 into the bore 32. For operating the plungers 49, a lever 60 is employed which has a web 61 with flanges 62 extending outwardly therefrom. A pintle 63 extends through the uppermost portion of the flanges 62 and through the body 31 of the coupling 30. The axis of this pintle is parallel to the plane of the groove 22. The lever 60, further, has a finger piece 64 which forms an extension of the web 61 and which extends outwardly from the lever in a direction opposite to the direction of extent of the flanges 62. A compression coil spring 65 is seated at one end in a socket 66 formed in the finger piece 64 and at the other end encircles a lug 67, issuing outwardly from the body 31. The free ends of the flanges 62 are formed with cams 68 which are adapted to engage the cam followers 52 on the plungers 49. These cams flare outwardly, as shown in FIGURES 2 and 3, and serve to force the plungers inwardly.

The operation of the invention is as follows:

In normal use, the valve head 46 is in engagement with valve seat 38 and fluid in the device connected to the connector 34 is restrained from flowing out of the coupling. At the same time, the valve head 27 is in engagement with the valve seat 26 and fluid, under pressure in receptacle 10, is prevented from flowing out of the fitting 20. When the device is to be coupled, the lever 60 is first manipulated by pressing the finger piece 64 toward the body 31 and against the action of the spring 65. This permits movement of the plungers 49 out of the bore 32. The device is then merely inserted over the projecting portion 21 and urged toward the receptacle 10. As the projecting portion 21 enters the bore 32 in body 31, the bevel 18 engages the cam followers 51 and forces the same outwardly, as shown in FIGURE 3. When the groove 22 lies in the plane of the bores 43, the parts are disposed as shown in FIGURE 4, and the lever 60 released. This causes the cams 68 to engage the cam followers 52 and force the plungers into the groove 22, as shown in FIGURE 2. The coupling is now securely locked to the fitting. As the coupling is being applied, pin 46 depresses valve head 27, permitting fluid to flow past the valve seat 26. The bore 32 is formed with a slight offset 54 which permits of readily inserting the leading end of the projecting portion 21 into the said bore. The O-ring 24, on reaching its offset, is compressed and forms a suitable seal between the coupling and the fitting. In the removal of the device, fingerpiece 64 is merely pressed toward the body 31 and the entire coupling withdrawn.

The advantages of the invention are manifest. The device is of extremely simple construction and can be fabricated at a nominal expense with equipment readily available. Application of the coupling to the fitting is simple and, likewise, removal of the coupling from the fitting. With the invention, no separate operation of the valve in the fitting is required, the same being opened when the coupling is pressed onto the fitting.

Changes in the specific form of the invention, as herein described, may be made within the scope of what is claimed without departing from the spirit of the invention.

Having described the invention, what is claimed as new and desired to be protected by Letters Patent is:

1. In combination with a fitting having a projecting portion with an annular groove therein, a coupling comprising a body having a cavity therein receiving said projecting portion with the groove disposed within the confines of said cavity, oppositely disposed coaxial radial guides in said body, plungers slidable in said guides and having inner ends movable into said groove to lock the coupling to the fitting, a lever extending along said body, means for pivoting said lever to said body for swinging movement about an axis parallel to the plane of the groove and to the axis of said guides, arms on said lever extending outwardly thereof and embracing said body and facing cams on said arms engaging the outer ends of said plungers and simultaneously moving both of said plungers inwardly to urge the inner ends of said plungers into said grooves to hold the coupling locked to said fitting.

2. In combination with a fitting having a projecting portion with an annular groove therein, a coupling comprising a body having a cavity therein receiving said projecting portion with the groove disposed within the confines of said cavity, aligned transverse coaxial radial bores in said body lying in the plane of said groove, cylindrical plungers slidable along said bores, heads on the inner ends of said plungers movable into said grooves to hold the coupling locked to said fitting, cam followers at the outer ends of the plungers, a lever pivoted to said body, arms extending outwardly from said lever and embracing said body, and facing cams on said arms engaging said cam followers and urging said heads into said groove.

3. In combination with a fitting having a projecting portion with an annular groove therein, a coupling comprising a body having a cavity therein receiving said projecting portion with the groove disposed within the confines of said cavity, aligned transverse radial bores in said body lying in the plane of said groove, cylindrical plungers slidable along said bores, heads on the inner ends of said plungers movable into said grooves to hold the coupling locked to said fitting, cam followers at the outer ends of the plungers, a single lever having a web extending along the surface of said body opposite said groove, flanges extending outwardly from said web and embracing and overlying said body at the locality of said bores, a pintle having its axis lying in a plane susbtantially parallel with said groove and extending through said flanges and body, said flanges serving as arms, and outwardly flaring cams on the outer ends of said arms and engaging the outer ends of said cam followers to urge said heads into said groove.

4. In combination with a fitting having a projecting portion with an annular groove therein, a coupling comprising a body, a connector projecting angularly outwardly from one side of said body, a cylindrical cavity in said body receiving said projecting portion with the groove disposed within the confines of said cavity, said connector having a passageway communicating with said cavity, aligned transverse radial bores in said body lying in the plane of said groove and disposed at right angles to the plane containing the axes of said connector and body, cylindrical plungers slidable along said bores, heads on the inner ends of said plungers movable into said grooves to hold the coupling locked to said fitting, cam followers at the outer ends of the plungers, a single lever having a web extending along the surface of said body on the side thereof opposite said connector, flanges extending outwardly from said web and embracing said body, a pintle at the side of said body opposite said connector having its axis lying in a plane susbtantially parallel with said groove and at right angles to the plane containing the axes of said body and connector, said pintle extending through said flanges and body, said flanges serving as arms, and outwardly flaring, facing cams on the outer ends of said flanges flaring outwardly with reference to the axis of the body and engaging said cam followers to urge the heads on said plungers into said groove, a finger piece formed on said web and spaced from said body and a compression coil spring disposed between said finger piece and body.

5. In combination with a fitting having a cylindrical projecting portion with an annular groove therein, a coupling comprising a body, a cylindrical cavity in said body receiving said projecting portion with the groove disposed within the confines of said cavity, said fitting and coupling having communicating passageways therethrough, aligned transverse radial bores in said body lying in the plane of said groove and disposed at right angles to the axis of said connector, cylindrical plungers slidable along said bores, spheroidal shaped heads on the inner ends of said plungers movable into said groove, tapered facing surfaces formed at the bottom of the groove for cooperation with the heads of said plungers and guiding said plungers to a central position within said groove, restrictions at the innermost ends of said bores engaging said heads and limiting inward movement of said plungers along said bores, cam followers at the outer ends of said plungers, a single lever U-shaped in cross section having a web extending along said body and flanges extending outwardly therefrom and embracing said body, a pintle at one side of said body having its axis parallel to a plane containing the axes of said body and plungers, said pintle extending through said flanges and body, outwardly flaring, facing cams on the outer ends of said flanges flaring outwardly with reference to the axis of the body and engaging said cam followers to urge the heads on said plungers into said groove, a finger piece formed on said web and spaced from said body and a compression coil spring disposed between said finger piece and body.

References Cited in the file of this patent

UNITED STATES PATENTS

| | | |
|---|---|---|
| 928,055 | Johnson | July 13, 1909 |
| 1,025,377 | Craig | May 7, 1912 |
| 1,261,687 | Brandon | Apr. 2, 1918 |
| 1,505,722 | Merz | Aug. 19, 1924 |
| 1,534,173 | Fogelberg | Apr. 21, 1925 |
| 2,092,116 | Hansen | Sept. 7, 1937 |
| 2,434,167 | Knoblauch | Jan. 6, 1948 |
| 2,516,428 | Scott | July 25, 1950 |
| 2,665,928 | Omon | Jan. 12, 1954 |
| 2,770,474 | Krapp | Nov. 13, 1956 |
| 3,024,031 | Davidson | Mar. 6, 1962 |

FOREIGN PATENTS

| | | |
|---|---|---|
| 715,160 | Great Britain | Sept. 8, 1954 |
| 60,085 | Netherlands | May 16, 1947 |